United States Patent [19]
Dannöhl

[11] Patent Number: 5,582,030
[45] Date of Patent: Dec. 10, 1996

[54] APPARATUS FOR PRODUCING NITROGEN

[75] Inventor: Peter F. Dannöhl, Bottrop, Germany

[73] Assignee: Druckluft Dannöhl GmbH, Germany

[21] Appl. No.: 425,651

[22] Filed: Apr. 20, 1995

[30] Foreign Application Priority Data

Oct. 6, 1994 [DE] Germany .................. 44 35 702.8

[51] Int. Cl.⁶ ............................................. B01D 53/22
[52] U.S. Cl. ........................ 62/640; 62/655; 95/47; 95/54
[58] Field of Search ................... 62/11, 18, 640, 62/642, 655; 95/54, 47

[56] References Cited

U.S. PATENT DOCUMENTS

| | | | |
|---|---|---|---|
| 4,894,068 | 1/1990 | Rice | 95/54 X |
| 4,931,070 | 6/1990 | Prassad | 95/54 |
| 4,934,148 | 6/1990 | Prassad et al. | 95/54 |
| 5,004,482 | 4/1991 | Haas et al. | 95/52 |
| 5,102,432 | 4/1992 | Prassad | 95/54 |
| 5,122,355 | 6/1992 | Prassad et al. | 423/351 |
| 5,169,412 | 12/1992 | Prassad et al. | 95/47 |
| 5,226,931 | 7/1993 | Combier | 95/45 |
| 5,429,664 | 7/1995 | Lee | 95/54 |

Primary Examiner—Christopher Kilner
Attorney, Agent, or Firm—Blakely Sokoloff Taylor & Zafman

[57] ABSTRACT

Air is compressed in an air compressor and cooled in an air cooler whereafter the impurities which have condensed out are removed. The air is subsequently reheated in a heat exchanger which is connected on the hot air side between the air compressor and the air cooler. The reheated air is passed through a plurality of membrane-type nitrogen separators, whereby the permeate of the last separator is constituted by nitrogen of the desired purity. The concentrate of this separator is recirculated to the suction side of the air compressor. The output control of the apparatus can be effected by means of an air feedback line which branches off before the heat exchanger and leads to the suction side of the air compressor. The flow through the air feedback line can be controlled by a valve which operates in dependence on the outlet pressure of the air compressor.

9 Claims, 1 Drawing Sheet

5,582,030

APPARATUS FOR PRODUCING NITROGEN

BACKGROUND OF THE INVENTION

1. Field of the Invention

The invention relates to a method and an apparatus for producing nitrogen in which air is compressed, cooled, cleaned, reheated and is finally passed through at least one membrane-type nitrogen separator stage.

2. Description of the Prior Art

Such a method of generating nitrogen is described in prior German Patent Application No. P 4404 072.5, which is not a prior publication. An air compressor is used therein which is cooled by the injection of oil, the oil being passed through a heat exchanger which for its part is used for reheating the cleaned air.

It has been found that this type of nitrogen production may be improved as regards its efficiency whilst at the same time reducing its constructional expense.

It is thus the object of the invention to provide a possibility for producing nitrogen more economically and with simpler apparatus.

SUMMARY OF THE INVENTION

In order to solve this object the method in accordance with the invention is characterised in that the reheating of the cleaned air is performed in heat exchange with the compressed air which is to be cooled.

The heat produced in the compressor is thus transmitted directly to the air to be introduced into the separator stage which is very much more favourable than doing it indirectly via the cooling oil required in the compressor. The necessary constructional cost is also reduced.

The invention provides above all the possibility of using an air compressor which operates without the injection of cooling oil. The entire cooling oil circuit is thus omitted.

It is proposed in an important embodiment of the invention that at least a portion of the cooled, cleaned air is recirculated to be compressed whilst reducing the output. This is particularly favourable because the proportion of the air which has been cleaned and is not required need not be blown off but is conducted in a circuit and retained in readiness.

When using at least two membrane-type nitrogen separator stages, the concentrate from at least one of the downstream separator stages, preferably the concentrate from the last separator stage, is preferably recirculated to the compressor. The concentrate from the first separator stage comprises air strongly enriched with oxygen whilst the permeate of this stage is already enriched with nitrogen. The concentrate from the downstream separator stages accordingly also consists of air enriched with nitrogen. If this, as proposed, is recirculated to the compressor, a considerable increase in efficiency is thereby produced.

The invention further provides an apparatus for producing nitrogen with an air compressor, at least one air cooler connected downstream of the air compressor, a condensate separator connected downstream of the air cooler, a heating device connected downstream of the condensate separator and at least one separator connected downstream of the heating device, whereby in order to solve the object posed this apparatus is characterised in that the heating device is constructed as a heat exchanger and is connected on the hot air side between the air compressor and the air cooler. The cleaned air is thus heated before flowing into the separator in heat exchange with the hot air flowing out of the compressor which is favourable as regards energy and simple as regards the apparatus. The hot air gives up a portion of its heat so that the downstream air cooler can be of correspondingly smaller dimensions or, under certain circumstances, can even be omitted completely.

The output of the air compressor is matched to the capacity of the separator. In the event of a reduction in output, the apparatus is characterised in a further embodiment of the invention by a valve-controlled air feedback line which branches off downstream of the condensate separator and leads to the suction side of the air compressor and which is opened when the output of the apparatus is to be reduced. For this purpose it advantageously includes a valve dependent on the outlet pressure of the air compressor.

Preferably connected downstream of the separator is an adjustable throttle controlled by an $O_2$ sampling device which determines the back pressure of the separator and thus the degree of purity of the nitrogen and may be acted upon by the air cleaned in the condensate separator for calibration purposes. It is advantageous to connect the $O_2$ sampling device on the inlet side via a three-way valve to a calibration line which communicates with the air feedback line upstream of the magnetic valve. The calibration process is then initiated by switching over the three-way valve so that the $O_2$ sampling device is no longer connected to the nitrogen line downstream of the separator but instead to the calibration line and is acted upon by cleaned air. The $O_2$ sampling device is preferably connected on the outlet side via a measuring gas feedback line to the suction side of the air compressor so that the measuring gas (whether calibration gas or nitrogen) is recirculated.

In an important further embodiment of the invention it is proposed that at least two separators are provided and that the concentrate outlet of at least one of the downstream separators, preferably the concentrate outlet of the last separator, is connected via a concentrate feedback line to the suction side of the compressor. The concentrate of the downstream separator, which is air enriched with nitrogen, is thus recirculated which results in an increase in efficiency. The concentrate feedback line is interrupted during the calibration of the $O_2$ sampling device.

The air feedback line, the concentrate feedback line and the measuring gas feedback line advantageously communicate with an air filter connected upstream of the air compressor.

It is also advantageous if the air compressor has a motor with a fan and if the fan is arranged opposite to the air cooler. The fan thus cools not only the motor but also supplies the air cooler with cooling air. The constructional expense is thus minimised.

Combinations and sub-combinations of the features of the invention, which differ from the attached claims, are also disclosed as being of importance to the invention.

The invention will be described below in more detail with reference to a preferred exemplary embodiment in conjunction with the attached drawing.

BRIEF DESCRIPTION OF THE DRAWING

The drawing is a flow diagram of an apparatus in accordance with the invention.

DESCRIPTION OF THE PREFERRED EMBODIMENT

Figure 1:
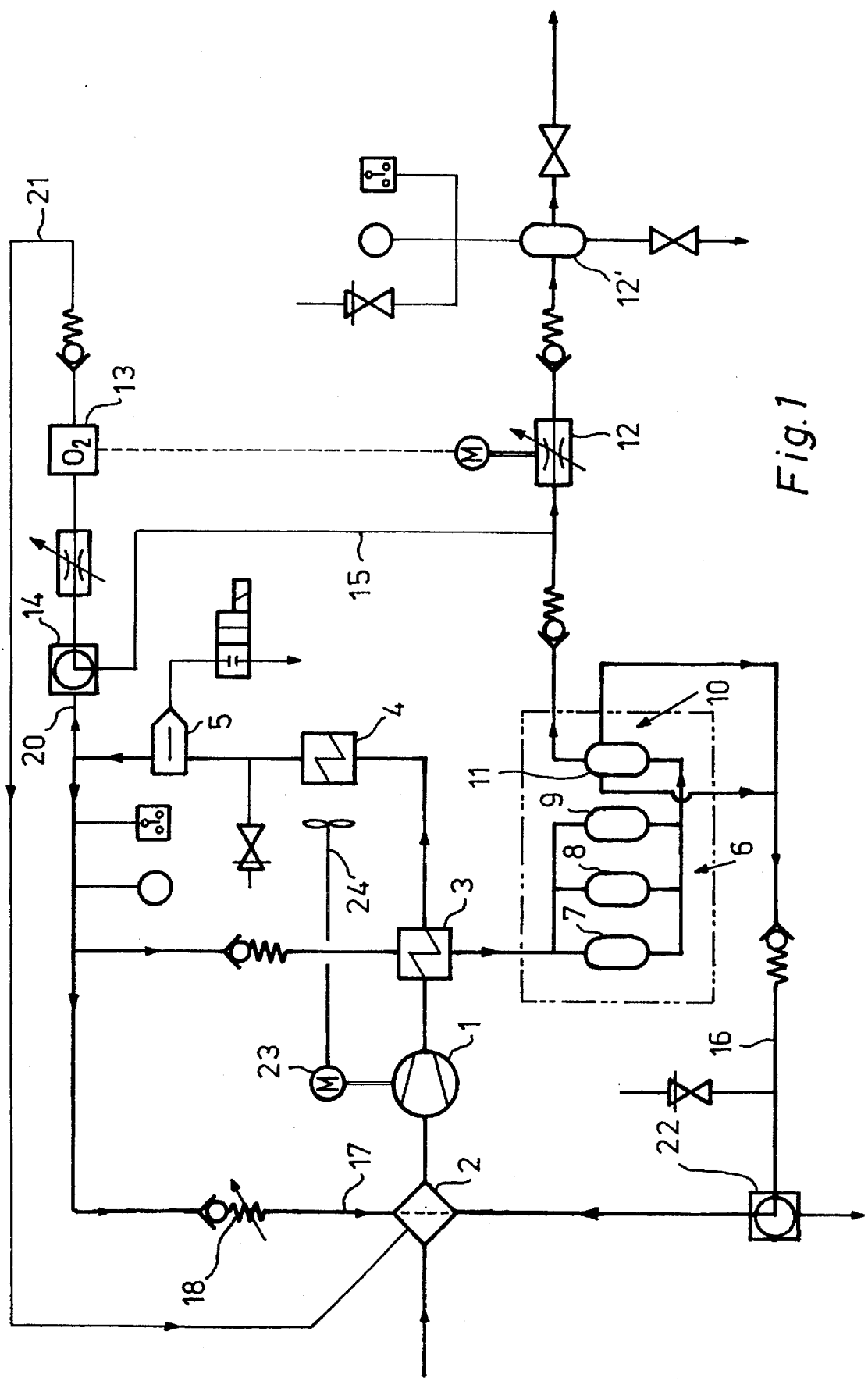

As shown, an air compressor 1 is provided and connected upstream of it on the suction side is an air filter 2. The compressed and accordingly heated air is passed through a heat exchanger 3, whose function will be explained below.

The air, which is still hot, flows out of the heat exchanger 3 to an air cooler 4 in which it is cooled to below the dew point of the condensible impurities. The air can correspondingly be cleaned in a condensate separator 5 connected downstream.

The cleaned air is then passed through the heat exchanger 3 in which reheating occurs in heat exchange with the uncleaned, hot air coming out of the air compressor 1 to the temperature at which the separation of the nitrogen is performed. The reheating of the air thus occurs using the heat which is in any event available from the compressor and does so with a high degree of efficiency and in a constructionally very simple manner.

The reheated air passes subsequently through a first separator stage 6, which comprises three separators 7, 8 and 9 connected in parallel. This is followed by a second separator stage 10 comprising a single separator 11.

The permeate of the separator 11, namely the nitrogen which is produced, is then supplied via an adjustable throttle 12 to a storage container 12'.

The adjustable throttle 12 serves to control the degree of purity of the nitrogen which is produced. For this purpose the throttle 12 operates in dependence on an $O_2$ sampling device 13 which is connected via a three-way valve 14 to a control line 15. The latter communicates with the line between the separator 11 and the adjustable throttle 12.

The permeate of the first separator stage 6, which supplies the second separator stage 10, consists of air enriched with nitrogen. The concentrate of the second separator stage 10 is also constituted by air enriched with nitrogen. This concentrate is supplied via a concentrate feedback line 16 to the air filter 2 and thus recirculated into the process. This results in a considerable increase in efficiency.

The output of the air compressor 1 is matched to the capacity of the separator. In the case of an output reduction, an air feedback line 17 can be provided which branches off between the condensate separator 5 and the heat exchanger 3 and leads to the air filter 2. The flow through the air feedback line 17 is controlled by a valve 18 which operates in adjustable dependence on the outlet pressure of the air compressor. Branching off downstream of the condensate separator 5 is a calibration line 20 which leads to the three-way valve 14. As soon as the $O_2$ sampling device 13 is to be calibrated, the three-way valve 14 is switched over. The $O_2$ sampling device is then no longer connected to the control line 15 but to the calibration line 20 from which it receives cooled and cleaned air.

The $O_2$ sampling device 13 is furthermore connected via a measuring gas feedback line 21 to the air filter 2. The measuring gas, be it nitrogen or calibration gas, is thus recirculated into the process.

During the calibration it is recommended that the feedback of the concentrate of the second separator stage 10 to the air filter 2 be interrupted. For this purpose the concentrate feedback line 16 is provided with a shut-off valve 22 in the form of a three-way valve.

The air compressor 1 has a motor 23 which is equipped with a fan 24. The latter is arranged opposite the air cooler 4 and supplies it with cooling air.

Overall, a constructionally very simple apparatus is produced which produces nitrogen of predetermined purity with very high efficiency.

Modifications are of course possible within the scope of the invention. Thus more than two separator stages can be used. The number and the connection in parallel or series of the separators in each stage may be matched to the operational requirements. If the heat exchanger 3 cools the hot air coming out of the air compressor 1 to a sufficient extent, the downstream air cooler 4 can be omitted. On the other hand, a plurality of air coolers can also be connected in series. With an optimum throughput matching of the compressor and separators an output controller for the compressor can be omitted. Furthermore, instead of the valve 18 an adjustable throttle could also be considered for the output control, optionally in combination with a magnetic valve.

I claim:

1. Apparatus for producing nitrogen with an air compressor (1), at least one air cooler (4) connected downstream of the air compressor, a condensate separator (5) connected downstream of the air cooler, a heating device connected downstream of the condensate separator and at least one membrane-type nitrogen separator (7, 8, 9, 11) connected downstream of the heating device, characterised in that the heating device is constructed as a heat exchanger and is connected on the hot air side between the air compressor (1) and the air cooler (4).

2. Apparatus as claimed in claim 1, characterised by an air feedback line (17) which includes a valve (18) and leads to the suction side of the air compressor (1) and branches off downstream of the condensate separator (5).

3. Apparatus as claimed in claim 2, characterised in that the valve (18) operates in dependence on the outlet pressure of the air compressor (1).

4. Apparatus as claimed in claim 1, characterised in that connected downstream of the separator (7, 8, 9, 11) there is an adjustable throttle (12) controlled by an $O_2$ sampling device (13) and that the $O_2$ sampling device may be acted on by the air cleaned in the condensate separator (5) for calibration purposes.

5. Apparatus as claimed in claim 4, characterised in that the $O_2$ sampling device (13) is connected on the inlet side via a three-way valve (14) to a calibration line (20) which branches off downstream of the condensate separator (5).

6. Apparatus as claimed in claim 4 or 5, characterised in that the $O_2$ sampling device (13) is connected on the outlet side via a measuring gas feedback line (21) to the suction side of the air compressor (1).

7. Apparatus as claimed in claim 1, characterised in that at least two membrane-type nitrogen separators (7, 8, 9, 11) are provided and that the concentrate outlet of at least one of the downstream separators, preferably the concentrate outlet of the last separator (11), is connected via a concentrate feedback line (16) to the suction side of the compressor.

8. Apparatus as claimed in claim 2, characterised in that the air feedback line (17), the concentrate feedback line (16) and the measuring gas feedback line (21) communicate with an air filter (2) connected upstream of the air compressor (1).

9. Apparatus as claimed in claim 1, characterised in that the air compressor (1) has a motor (23) with a fan (24) and that the fan is arranged opposite to the air cooler (4).

* * * * *